United States Patent [19]

Schindler

[11] 4,217,696

[45] Aug. 19, 1980

[54] TIME-DISTANCE CALCULATOR

[76] Inventor: John R. Schindler, P.O. Box 5171, Klamath Falls, Oreg. 97601

[21] Appl. No.: 38,665

[22] Filed: May 14, 1979

[51] Int. Cl.$^2$ .............................................. G01B 3/12
[52] U.S. Cl. ................................ 33/141 C; 33/1 SB; 33/142; 235/79.5
[58] Field of Search ................ 33/1 SB, 1 SC, 1 SD, 33/141 C, 141 D, 141 E, 142; 235/79.5–81 A, 87 R, 87 A

[56] References Cited

U.S. PATENT DOCUMENTS

| 997,648 | 7/1911 | Cavanagh | 33/141 C |
|---|---|---|---|
| 1,383,340 | 7/1921 | Robbins | 33/141 C |
| 2,363,545 | 11/1944 | Morehead | 33/141 C |
| 3,494,039 | 2/1970 | Porter | 33/142 |
| 3,514,582 | 5/1970 | Sanderson | 33/1 SB |

FOREIGN PATENT DOCUMENTS 449505 6/1926 United Kingdom ................ 33/141 C

Primary Examiner—Charles E. Phillips
Attorney, Agent, or Firm—Kolisch, Hartwell & Dickinson

[57] ABSTRACT

A device for measuring linear or curvilinear map distance and determining the rate or time of travel represented by such distance. The device includes an elongate, hollow body having a slot extending along a portion of its length, an indicator shiftable along the slot, and a traction element rotatably mounted at one end of the body. Rotation of the traction element, as the same is moved across a surface, such as a map surface, along a selected path, produces indicator shifting which is proportional to the distance represented by such path. The apparatus also includes a transparent, cylindrical sleeve mounted on the body for rotation relative thereto. This sleeve carries radial and axial calibrations which are alignable with the slot and the indicator, respectively, when the sleeve is rotated, to produce distance-related time and rate of travel determinations, respectively.

3 Claims, 4 Drawing Figures

U.S. Patent
Aug. 19, 1980
4,217,696
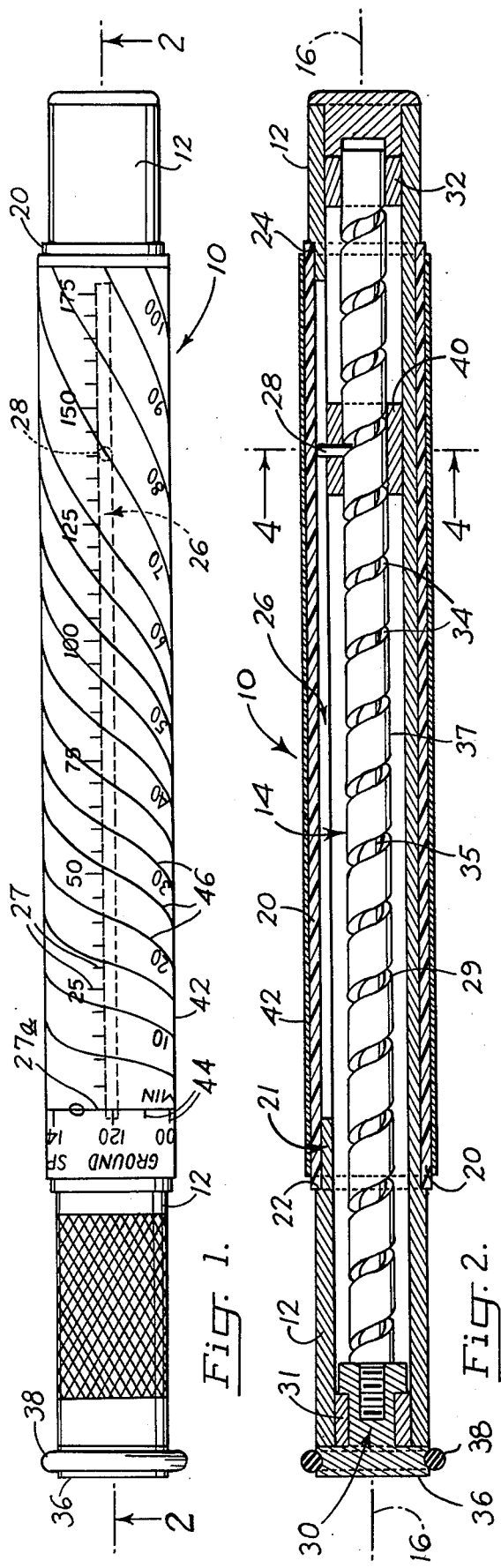
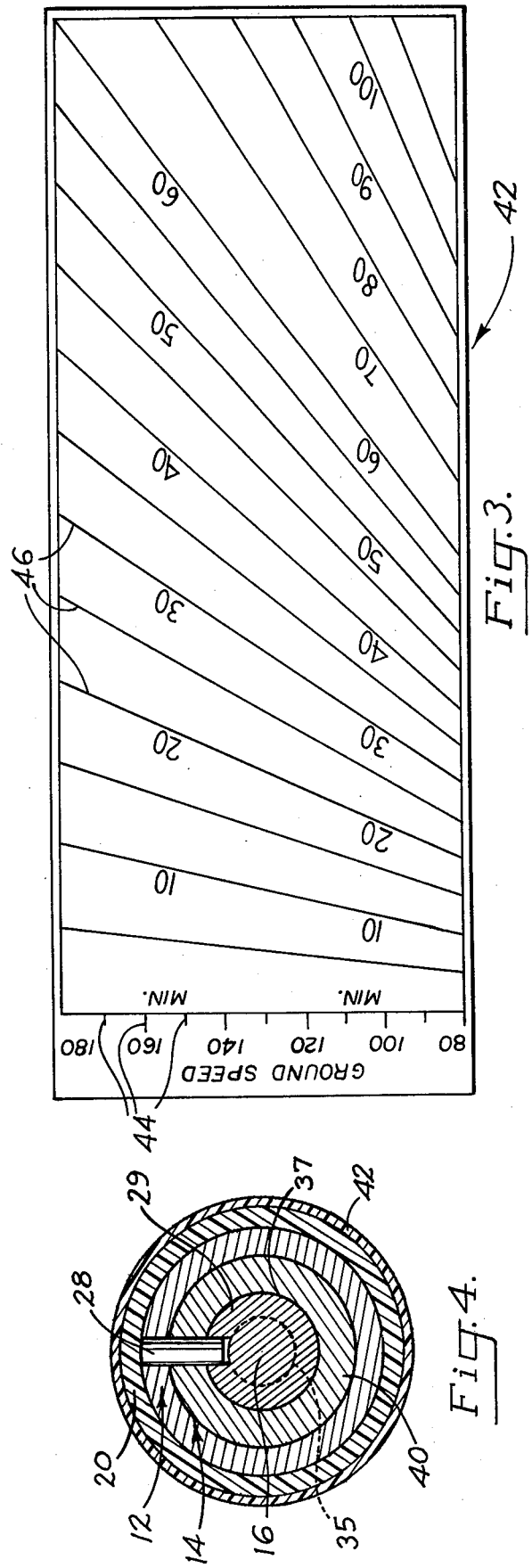

1

TIME-DISTANCE CALCULATOR

BACKGROUND AND SUMMARY

The present invention relates to navigational tools, and in particular, to a mechanical measuring and calculating device usable in navigating aircraft and the like.

One object of the present invention is to provide a flight navigational instrument for measuring linear or curvilinear distances on a map.

Another important object is to provide such a device for determining the flight rate or time of travel represented by known map distances.

It is another object of the present invention to provide a navigational tool which can be operated and read easily.

Yet another object of the invention is to provide such a navigation aid which is simple in construction.

The present device includes an elongate, hollow body having a slot formed along a major portion of its length. Rotatably mounted at one end of the body is a traction element which is engageable with a map surface to produce rotation of the element as the device is moved along a selected path on the map. An indicator mounted for shifting along the slot is operatively connected to the traction element for linear movement in response to rotation of the element. A transparent, cylindrical sleeve is mounted over a portion of the body for rotation relative thereto, this sleeve having radial and axial calibrations by which time or rate of travel determinations can be made.

In operation, the traction element is moved along such path on the map, shifting the indicator to a position along the slot indicating the map distance traversed. The sleeve is then rotated, to align a preselected radial or axial calibration with the slot or the indicator, respectively, whereby time, or rate of travel represented by the measured distance may be determined.

These and other objects and features of the present invention will become more fully apparent when the following description is read in connection with the accompanying drawings, wherein:

DRAWINGS

FIG. 1 is a side view of the present invention.

FIG. 2 is a sectional view of the invention, taken generally along the line 2—2 in FIG. 1.

FIG. 3 shows a decal with calibrations which is wrapped around a transparent sleeve employed in the device of FIG. 1.

FIG. 4 is an enlarged sectional view of the invention, taken generally along the line 4—4 in FIG. 2.

DETAILED DESCRIPTION OF A PREFERRED EMBODIMENT OF THE INVENTION

Turning now to the figures, and particularly to FIGS. 1, 2 and 4, at 10 is indicated generally the measuring and calculating apparatus of the present invention. Included in apparatus 10 are an elongate, hollow body 12, an axial rotating assembly 14 mounted within the body for rotation along the body's central axis 16 (FIG. 2), and a transparent, cylindrical sleeve member, or sleeve 20 which is mounted on a portion of body 12 for rotation relative thereto about axis 16.

Considering the detailed construction of apparatus 10, with reference particularly to FIG. 2, body 12 includes an elongate, cylindrical tube which is channeled along its central axial portion to form a reduced-diameter axial section 21 extending between the opposed annular shoulders 22, 24 defining the left and right ends of this section, respectively, in FIG. 2. Formed within body 12, along a portion of its length between shoulders 22, 24, is an elongate track, or slot 26. A scale of fixed axial calibrations, such as calibrations 27 seen in FIG. 1, are carried on body 12 along track 26. These calibrations represent map distances, in statute miles, measured from a zero calibration 27a in FIG. 1. An indicator 28 is shiftably mounted within housing 12 for movement along track 26 in a manner to be described.

Rotating assembly 14 includes a worm screw 29 and, attached to the screw's left end in FIGS. 1 and 2 for rotation therewith, an assembly cap 30. The assembly is journaled within housing 12 by a pair of opposed bearings 31, 32 which rotatably mount cap 30 and the right end of screw 29, respectively, in FIG. 2. Screw 29 has formed therein, along at least that portion of the screw coextensive with slot 26, a helical groove 34. As seen in FIG. 2, the pitch of groove 34 is constant along the length of the screw. With reference to FIG. 4, the depth of the groove is indicated by the radial distance between the innermost dashed-line circle 35 representing the ungrooved portion of the screw, and the adjacent solid-line circle 37, representing the outer surface of the screw.

Cap 30 includes a traction ring 36 exposed at the left end of body 12 in FIGS. 1 and 2, and an O-ring 38, which fits snugly over an annular groove formed on the peripheral edge of this ring (FIG. 2). The exposed, rotative structure just-described, including ring 36 and O-ring 38, form a traction element for frictionally engaging a map surface, as the traction element is guided across the same.

With reference particularly to FIGS. 2 and 4, indicator 28 is coupled to screw 29 by a sleeve 40, the outer and inner diameters of which are dimensioned to allow the sleeve to slide between the interior of body 12, and the outer surface of screw 29, respectively. Indicator 28 includes a pin which is rigidly secured in a suitable opening in the wall of sleeve 40, with the lower end of the pin in FIGS. 2 and 4 extending into groove 34 and the upper end of the pin in these figures extending into slot 26.

From the foregoing, it can be appreciated that as assembly 14 is rotated, by rotating the above-mentioned traction element, indicator 28 acts as a groove follower, wherein the indicator and sleeve 40 are advanced along the screw, with the upper end of the indicator in FIGS. 2 and 4, shifting along slot 26. Because the pitch of groove 34 is constant along the length of the screw, the extent of movement of the indicator in response to rotation of the traction element is proportional to the extent of rotation thereof. Grooved screw 29 and sleeve 40 are also referred to herebelow as means operatively connecting the traction element and the indicator.

Sleeve 20 is formed of a section of thin-walled transparent tubing having a length substantially equal to that of section 21. A lengthwise slit (not seen) in the sleeve allows the same to expand diametrically as it is slipped over body 12 to its position shown in FIGS. 1 and 2 during construction of the device. The radial resilience of the plastic material forming the sleeve urges the slit axial edges thereof together, whereby the sleeve frictionally engages the channeled section of the body.

Turning now to FIG. 3, there is shown at 42 a transparent tape decal having a sticky-surfaced backing used for wrapping the decal securely about sleeve 20, with the latter placed about section 21 as just described. The width of decal 40 is somewhat greater than the perimeter of sleeve 20, wherein the axial edges of the decal overlap somewhat when placed about the sleeve. The decal thus serves to hold the slit edges of the sleeve together, increasing the frictional engagement between the sleeve and the body. The length of decal 40 is somewhat less than the length of sleeve 20, as seen in FIGS. 1 and 2.

Decal 40 carries a radial scale of calibrations, such as calibrations 44, and an axial of linear calibrations, such as calibrations 46. Calibrations 44 represent, in equal increments, increasing ground speed, here represented in units of miles per hour. Calibrations 46 represent, from left to right in FIG. 3, increasing time, in minutes, with the slopes of the calibration lines being determined by the linear relationship between distance (measured along the axial direction and corresponding to distances represented by calibrations 27, when the decal is affixed to the sleeve), rate and time. As seen in FIG. 1, when decal 40 is wrapped about sleeve 20, calibrations 46 are helical.

Describing now the operation of the present invention, typically a small-plane pilot will employ, as one of his navigational aids, a flight map of the area over which he is flying. To determine the ground distance represented by any linear or curvilinear path on the map, the user initially rotates the traction element in one direction to shift indicator 28 to a zero position adjacent calibration 27a. The user then places the traction element on the map surface and guides the traction element along the desired linear or curvilinear path on the map, with the element rotating in the opposite direction. By the mechanism above described, rotation of the traction element, as the same is moved along such path, produces linear movement of indicator 28 along slot 26 from calibration 27a toward the right in FIGS. 1 and 2, to a calibration 27 indicating the map distance traversed. As an example, in FIG. 1, indicator 28 has been shifted adjacent a calibration 27 representing 140 statute miles.

With indicator 28 positioned at one of calibrations 27 representing a measured distance, the device can be used to determine the time required to travel such distance, at a given ground speed. Conversely, when the time required to travel such distance is known, the ground speed at which the craft is traveling can be determined.

Further explaining, let it be assumed that indicator 28 has been moved along the slot to place it as is shown in FIG. 1, adjacent calibration 27 representing 140 statute miles. Let it be further assumed that the ground speed of the aircraft is known to be 120 m.p.h. By turning sleeve 20 to place "120" of claibrations 44 over slot 26, as shown in FIG. 1, the time required to fly the 140 miles may be determined by noting where indicator 28 falls with relation to the calibrations 46 on the sleeve. In the example being described and with reference to FIG. 1, indicator 28 falls under the calibration in calibrations 46 identified by the number "70". This is indicative of fact that the time required to fly the distance of 140 miles at the ground speed of 120 m.p.h. would be 70 minutes.

Assuming again that the distance to be traveled is indicated by the indicator as 140 miles, and now assuming that the pilot wishes to travel this distance in 70 minutes, the pilot is enabled to determine the ground speed that he should fly by placing the calibration 46 identified by the numeral "70" over the indicator 28 through rotative adjustment of sleeve 20. He thus is enabled to read the ground speed by noting where the slot 26 falls with relation to the calibrations 44 which extend about one end of the sleeve. In the example described and with reference to FIG. 1, the pilot would be informed that a ground speed of 120 m.p.h. should be maintained since the calibration 44 identified by the number "120" falls over the slot 26.

A measuring and calculating device, which is usable by a flight navigator to measure a map distance and from such measurement, to calculate the time or rate of travel corresponding to such distance, has thus been disclosed. Various modifications and changes in the above apparatus may be made without departing from the spirit of the invention.

It is claimed and desired to secure by Letters Patent:

1. Measuring and calculating apparatus comprising
   an elongate body defining a track along a portion of its length,
   a traction element rotatably mounted at one end of said body, adapted to be moved across a surface with the element in engagement therewith,
   an indicator movable along said track,
   means operatively connecting said traction element and said indicator to move the indicator along said track in response to rotation of the traction element as the latter is moved across a surface,
   a substantially transparent, elongate sleeve member mounted on said body over said portion for rotation thereabout, and
   means defining radial and axial calibrations on said sleeve, with rotation of said sleeve being performable to align selected radial and axial calibrations with said track and said indicator, respectively.

2. The apparatus of claim 1 which further includes means defining fixed axial calibrations carried on said body along said track.

3. The apparatus of claims 1 or 2, wherein said body is a cylindrical tube, and said track is an elongate slot defined therein.

* * * * *